United States Patent [19]

Lomashevich et al.

[11] Patent Number: 5,001,523
[45] Date of Patent: Mar. 19, 1991

[54] OPTICAL TRANSISTOR

[76] Inventors: Svyatoslav A. Lomashevich, Pargolovo, ulitsa Zavodskaya, 24, kv. 7, Leningrad; Jury L. Bystrov, Prospekt 30-letia Pobedy, 30, kv. 160, Penza; Galina A. Semenova, ulitsa Turku, 9, korpus 5, kv. 201, Leningrad, all of U.S.S.R.

[21] Appl. No.: 449,529

[22] Filed: Dec. 11, 1989

[30] Foreign Application Priority Data

Dec. 13, 1988 [SU] U.S.S.R. ............... 4619989

[51] Int. Cl.$^5$ .................. H01L 31/12; H01L 31/16; G07B 6/10
[52] U.S. Cl. .................... 357/19; 357/16; 357/17; 357/45; 372/8; 372/94; 350/96.12; 350/96.15; 350/354
[58] Field of Search ............ 357/19, 16, 17, 45; 372/8, 21, 50, 94; 350/353, 354, 355, 386, 96.11, 96.12, 96.13, 96.14, 96.15; 365/64, 215, 234; 364/713

[56] References Cited

U.S. PATENT DOCUMENTS

| | | | |
|---|---|---|---|
| 3,610,731 | 10/1971 | Seidel | 350/354 |
| 3,849,740 | 11/1974 | Brandt | 372/8 |
| 4,632,518 | 12/1986 | Jensen | 350/354 X |
| 4,695,121 | 9/1987 | Mahapatra et al. | 350/96.12 |
| 4,775,214 | 10/1988 | Johnson | 350/96.12 X |
| 4,805,975 | 2/1989 | Utaka et al. | 350/96.15 X |
| 4,846,542 | 7/1989 | Okayama et al. | 359/96.12 X |

FOREIGN PATENT DOCUMENTS 7730860 10/1977 France.
7921763 2/1979 France.

OTHER PUBLICATIONS

Bends in Optical Dielectric Guides–E. A. J. Marcatili, Bell System Tech. Jr, Sep. 1969, pp. 2103–2132.

Primary Examiner—Andrew J. James
Assistant Examiner—Sara W. Crane
Attorney, Agent, or Firm—Burgess, Ryan & Wayne

[57] ABSTRACT

An optical transistor comprising two semiconductor lasers 1, arranged in a nonlinear ring vibrator 2, and two strip waveguides 3, each of which has a region A of optical coupling with the nonlinear ring vibrator 2, positioned on a common substrate. The regions of optical coupling are positioned diametrically opposite each other. The semiconductor lasers 1 have electrodes 4 for power supply. Each région A of optical coupling is provided with a control electrode 5 and each section of the nonlinear ring vibrator 2, located between the semiconductor 1 and corresponding regions of optical coupling, is also provided with a control electrode 6. Mirrors 7 form vibrators for the semiconductor lasers 1.

3 Claims, 7 Drawing Sheets

OPTICAL TRANSISTOR

BACKGROUND OF THE INVENTION

The present invention relates to the field of processing information presented by optical signals, in particular to optical logic, amplification and optical signal commutation devices having semiconductor structures. The preferable field of use is for fiber-optical communications and information transmission systems, integral optic and computer engineering circuits.

A "Nonlinear interferometer" (U.S. Pat. No. 3,813,609, 1969) device is known, which makes it possible to obtain a two-valued hydteretic relationship between the output power of optical radiation and the input power. This characteristic can be converted to the single-value relationship of differential amplifier by the initial detuning of a Fabry-Perot resonator. The main member of this device, a nonlinear saturable absorber, the index of which changes with the intensity of incident radiation, brightens when a certain threshold of light intensity is exceeded. Experimental research has been conducted on the possibility of realizing optical devices in logic elements of a memory.

The use of dielectric material as the working medium requires large pump power ($10^8 W/cm^2$), i.e. the use of powerful lasers, because of the small nonlinearity factor of that material.

Furthermore, fixed tuning of the resonator to a frequency and the absence of a control voltage on the dielectric crystal eliminate the possibility of changing the wave length of the output radiation. This determines the field of use of the device—for laboratory research on the bistable effect. On the other hand, at present there is no engineering solution for an integral optical combination of a semiconductor laser and a dielectrical element. These reasons provide an obstacle for practical realization of this device.

A "Bistable integral optical device" is known (see, for example, French Patent No. 2464498), in which directional couplers are encompassed by positive electrical feedback so that a bistable mode is realized in the device. Advantages of this device are its small size, the possibility for integral realization with a high degree of isolation between the forward and alternative channels. Drawbacks are absence of the possibility for changing the frenquency of the output radiation, the necessity for using a photodetector and an amplifier with a nonlinear response in the feedback circuit, which is a consequence of using electrical feedback in that device.

The device among the known devices which is closest with respect to technical substance to the proposed device is that produced by the "Hughes Aircraft" company (E.A.J. Marcatili "Bends in Optical Dielectric Guides", The Bell System Technical Journal, vol. 48, No. 7, 1969, 2103-2132). The device is an optical gate, selecting the radiation of a different frequency over channels: that frequency is selected from three frequencies, propagating along a waveguide optically coupled to a nonlinear resonant ring, which corresponds to the resonant frequency to which the ring is tuned, that frequency is radiated and switching accomplished.

An advantage of this device is its compact size and the use of resonant rings as integral logic elements. Wherein, the resonant rings are made with a high Q-factor ($0-10^8$) and with a difference in the indexes of refraction of the waveguide and the environment at 0.01% of the radius of the ring P equal to 0.04–1 mm.

Drawbacks of this device are: the absence of an external pump source for optical radiation to initiate the nonlinear effects when fixing low level signals; the absence of full access and reciprocity between the optical contacts; the absence of the possibility for changing the wave length of output radiation and the tuning of the resonant ring; the substantial power level of the input signals necessary to excite the nonlinear effects in the resonant ring using the energy of those same input pulses, which is a consequence of the absence of input pulses and the absence of active members inside the system itself; there is no restoration of signal power loss.

SUMMARY OF THE INVENTION

At the base of the invention is the problem of creating an optical transistor with an expanded range of functional possibilities achieved by obtaining bistable characteristics and differential gain having a steep slope.

This problem is solved in an optical transistor comprising a nonlinear ring vibrator and at least one pair of strip waveguides, positioned on a common substrate, each pair having a region of optical coupling with the nonlinear ring vibrator, wherein the regions of optical coupling corresponding to the pair of strip waveguides are positioned diametrically opposite each other, in accordance with the invention, in order to expand the functional possibilities by obtaining bistable characteristics and a differential gain having a steep slope, by additionally introducing therein at least two semiconductor lasers positioned in the nonlinear ring vibrator outside the regions of optical coupling, wherein each region of optical coupling and each section of the nonlinear ring vibrator located between the semiconductor lasers and the regions of optial coupling are provided with control electrodes.

It is feasible that the optical transistor comprises four semiconductor lasers and two pairs of strip waveguides, wherein the axial lines of each of the strip waveguides, passing through the central portions of each of the strip waveguides and lying in the region of optical coupling of the strip waveguides with the nonlinear vibrators, form a 45° angle with each of the neighboring end sections of the strip waveguide, and the neighboring end sections of the strip waveguides have four pairs of mutal optical coupling regions provided with control electrodes and positioned in pairs on two mutually perpendicular diametrical straight lines.

It is also feasible that the optical transistor forms a matrix as a composite member with the full number of inputs equal to 2n, where n is the number of cells in the switching matrix which are formed by one ring vibrator, comprising four lasers, and four strip waveguides.

The proposed invention makes it possible to:

concentrate the optical radiation of the input signals and the pump radiation of the lasers in space in one number—the resonant ring, from which the output radiation is taken to the optical contacts;

operate in two modes: bistable and the mode of amplifying low value microwatt optical signals with a high (to $10^4$) gain factor;

obtain a high threshold sensitivity, ensured by the presence of pump sources-lasers, holding the system near the point of passing abruptly to resonance;

control the output characteristic of the device by changing the optical characteristics of the nonlinear vibrator and the lasers, which results in an expansion of the functional possibilities of the device and the possibility for using it as an amplifier, pulse former, memory element, discriminator limiter;

reemit the input optical signal into an output optical signal with frequencies different from those in the input signal, wherein by selecting the control voltage it is possible to achieve a descrete coincidence of the natural frequencies of radiation of the semiconductor lasers with the frequencies of the input signal;

prevent broadening of the optical pulses being transmitted by frequency filtration of the optical signals being passed by the optical transistor.

An embodiment of the device with four symmetrical optical contacts makes it possible to use it as a splitter, demultiplexer, commutator of optical channels.

Another embodiment of the device makes it possible to use it as a switching matrix with amplification.

DESCRIPTION OF THE DRAWINGS

The present invention is explained by a comprehensive description of examples of concrete realization with reference made to the enclosed drawings, wherein.

DETAILED DISCLOSURE

Figure 1:
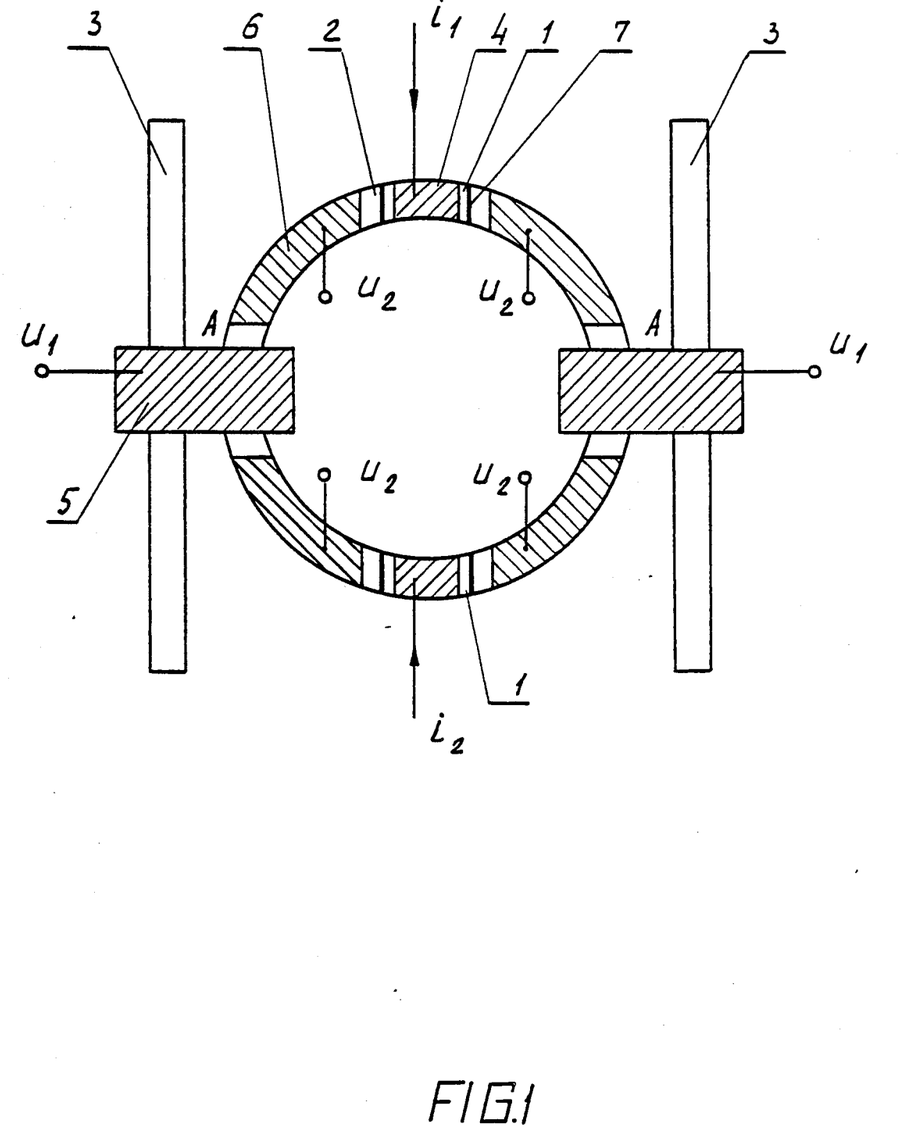
FIG. 1 shows a first example of a concrete realization of an optical transistor according to the invention.

The first example of a concrete realization of an optical transistor (FIG. 1) comprising two semiconductor lasers 1, positioned in a nonlinear ring vibrator 2, and a pair of strip waveguides 3, positioned on a common substrate, each pair having a region of optical coupling with the nonlinear ring vibrator 2. The regions of optical coupling are positioned diametrically opposite each other. The semiconductor lasers 1 have electrodes 4 for supplying power, each region of optical coupling is provided with a control electrode 5, and each section of the nonlinear ring vibrator 2, located between the semiconductor laser 1 and the corresponding regions of optical coupling is also provided with a control electrode 6. Mirrors 7 form vibrators for the semiconductor lasers 1.

Figure 4:
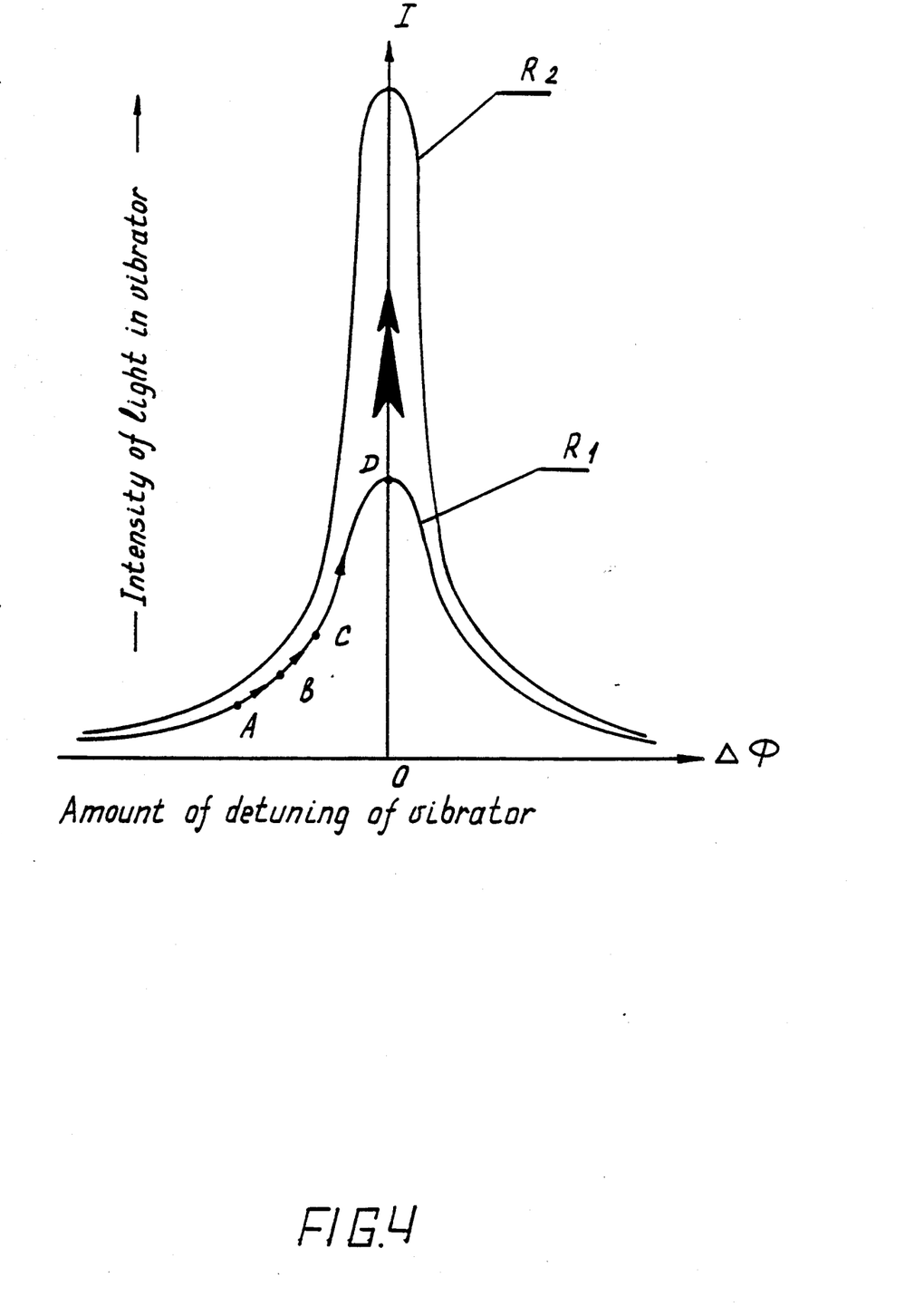
FIG. 4 shows the resonant characteristics of a nonlinear ring vibrator.

The optical transistor operates in the following manner. For the mode of operation corresponding to the bistable characteristic, the current values $i_1$ and $i_2$ passing through the semiconductor lasers 1 and the values of voltages $U_1$ and $U_2$ on the control electrodes 5 and 6 in the initial state of the optical transistor in the absence of an input (external) optical signal are such that the full intensity of the output radiation of the semiconductor lasers 1 does not reach the threshold of the nonlinear effect in the material of the nonlinear ring vibrator 2, wherein the latter is in a state far from resonance. This state of the optical transistor for passing light from the input to its output corresponds to point A on curve $R_1$ (FIG. 4, wherein I is the intensity of light in the nonlinear ring vibrator 2, $\Delta\Phi$ is the amount of detuning of the nonlinear ring vibrator 2). When the threshold value of the intensity of light in the nonlinear ring vibrator 2 is exceeded (by increasing currents $i_1$ and $i_2$ or changing voltages $U_1$ and $U_2$) a transition of the optical transistor to the mode of operation, defined by points B, C and D on curve $R_1$ takes place, i.e. the ring vibrator 2 is tuned to resonance by brightening the latter. Before the transition of the semiconductor lasers 1 to the mode of radiation stimulation the geometric location of points defining the mode of operation of the optical transistor is therefore the curve $R_1$. With a further increase in the intensity of light inside the nonlinear ring vibrator 2 the index of refraction in the active region of the semiconductor lasers 1 increases according to the equation $n=n_0+n_2 I$, where $n_2$ is the nonlinearity coefficient of the material of the nonlinear ring vibrator 2, $n_0$ is the index of refraction when there is no radiation. An abrupt transition of the semiconductor lasers 1 to the mode of stimulated radiation takes places, which in turn increases even more the intensity of light in the nonlinear ring vibrator 2, which causes a transition of the working point of the optical transistor to the resonant curve $R_2$ (FIG. 4).

Figure 5:
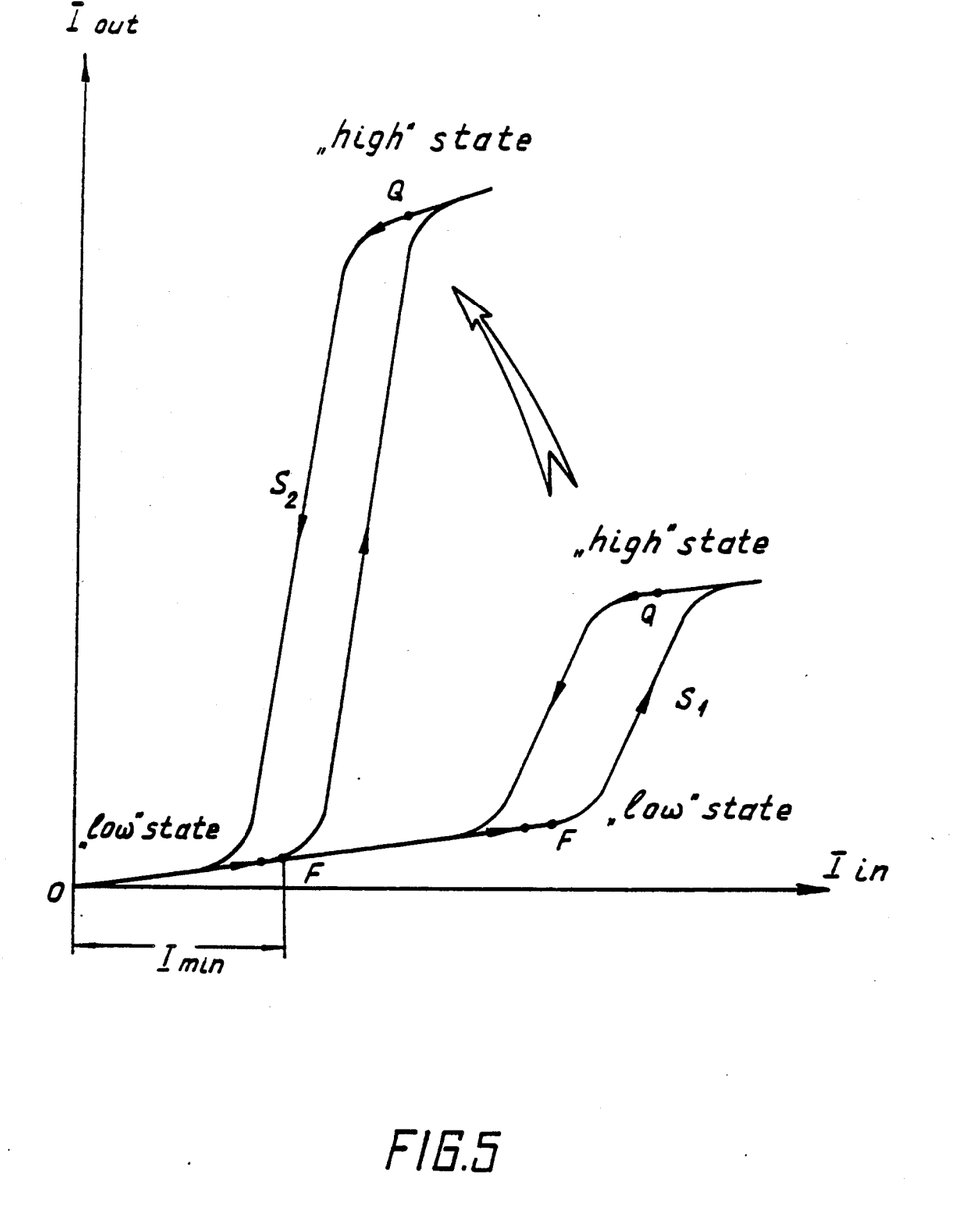
FIG. 5 shows the bistable characteristics of an optical transistor according to the invention.

Two hysteres in curves $S_1$ and $S_2$ correspond respectively to the two resonant curves $R_1$ and $R_2$ (FIG. 5).

When an input optical signal of intensity $I_{in}$, the value of which corresponds to such an additional increase in the optical intensity in the nonlinear ring vibrator 2, that the process under consideration, the avalanche-like change in the properties of the nonlinear material in the ring vibrator 2, is initiated, is applied, this causes a transition of the optical transistor to the state defined by point Q (from the state, defined by point F). Since each elementary cell, the strip waveguide 3-nonlinear ring vibrator 2, is a bistable element with positive feedback accomplished through the nonlinear ring vibrator 2, the transfer of light energy in the latter also occurs abruptly (according to a bistable characteristic, similar to characteristics $S_1$ and $S_2$ in FIG. 5). In turn, the specified bistable break in the signal being transferred excites a sharp rise in the intensity of light in the nonlinear ring vibrator 2, which means an increase in the intensity of light for the bistable cell, the strip waveguide 3-nonlinear ring vibrator 2, even more accelerating the speed of the transition of the optical transistor to the state defined by point Q (FIG. 5). The maintenance of the device in a stable state corresponding to the said point of the mode, continues until the intensity of the light inside the nonlinear ring vibrator 2 is not reduced to the value Imin by an abrupt reduction of the value of currents $i_1$, $i_2$ sufficient to return the device to the initial state (in the absence of an external optical signal). The nonlinear ring vibrator 2 ensures both interconnection between the semiconductor lasers 1, similar to the interconnection in the $C^3$-lasers system, and joint operation of the elementary bistable cells, the strip waveguide 3-nonlinear ring vibrator 2.

Symmetrical positioning of the lasers ensures the equivalence of all the optical inputs and outputs of the optical transistor with respect to optical signals, and also uniform pumping of the semirings of the nonlinear ring vibrator 2.

Stable conditions of the optical transistor correspond to the stable conditions accepted for the $C^3$-lasers and other devices based on optically coupled nonlinear vibrators, including therein bistable optical elements.

Figure 6:
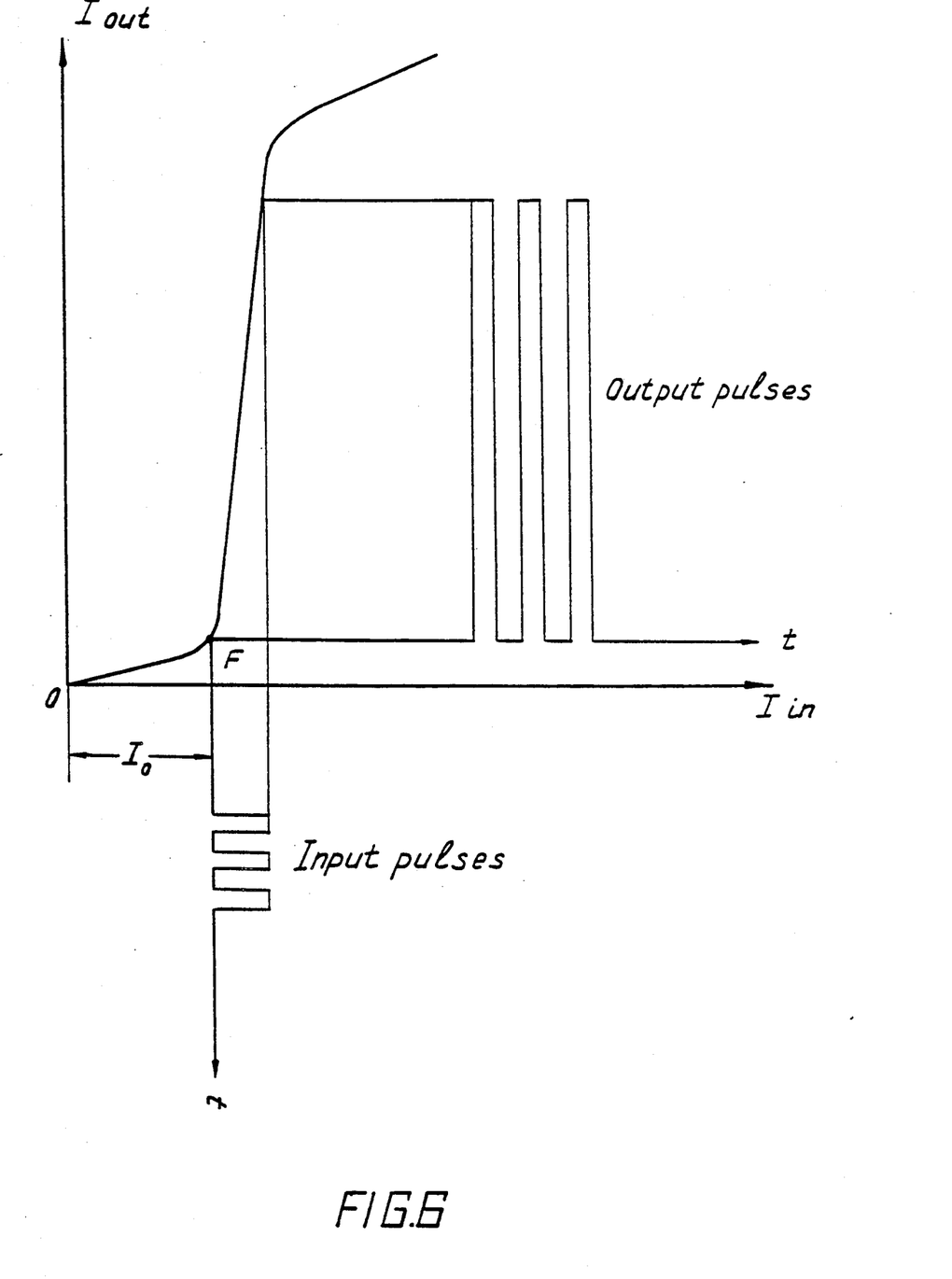
FIG. 6 shows the differential gain characteristics of an optical transistor according to the invention.

In the operation mode, corresponding to the differential gain characteristic, the optical transistor has a variable gain characteristic slope, i.e. $K_{gain}=(I_{in})$ (FIG. 6). For operation of the optical transistor as an amplifier of the optical signals with the said properties, the value I of the semiconductor lasers 1 corresponding to the working point on the characteristic $K_{gain}=(I_{in})$ is set by the currents $i_1$ and $i_2$. The values of voltages $U_1$ and $U_2$, and also the value of the input optical signal, are such that the optical transistor in the case of an abrupt increase in the intensity of light inside the nonlinear ring vibrator 2 does not yet pass to the bistable operation mode, but works as an optical amplifier with a gain factor of $10^3$–$10^4$.

Figure 2:
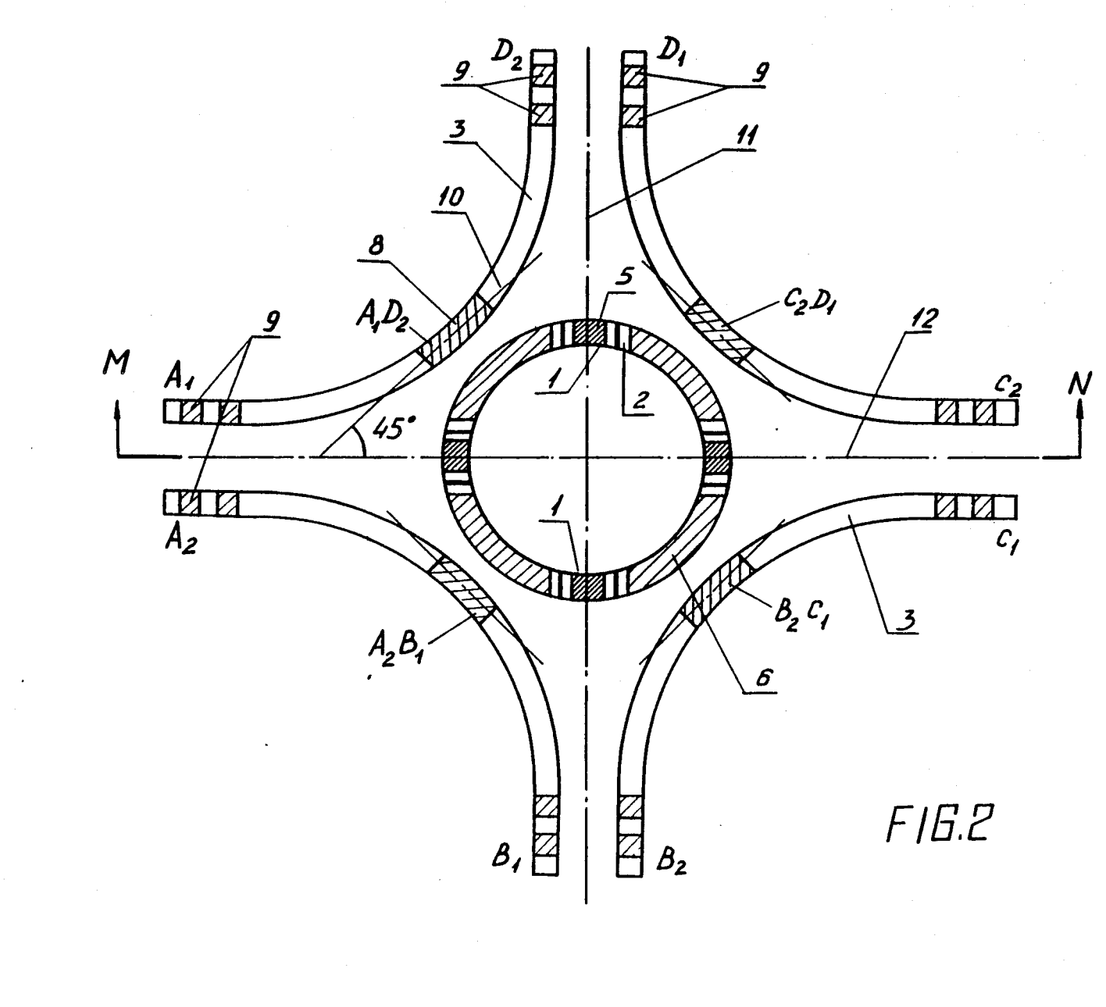
FIG. 2 shows a second example of a concrete realization of an optical transistor according to the invention.
Figure 3:
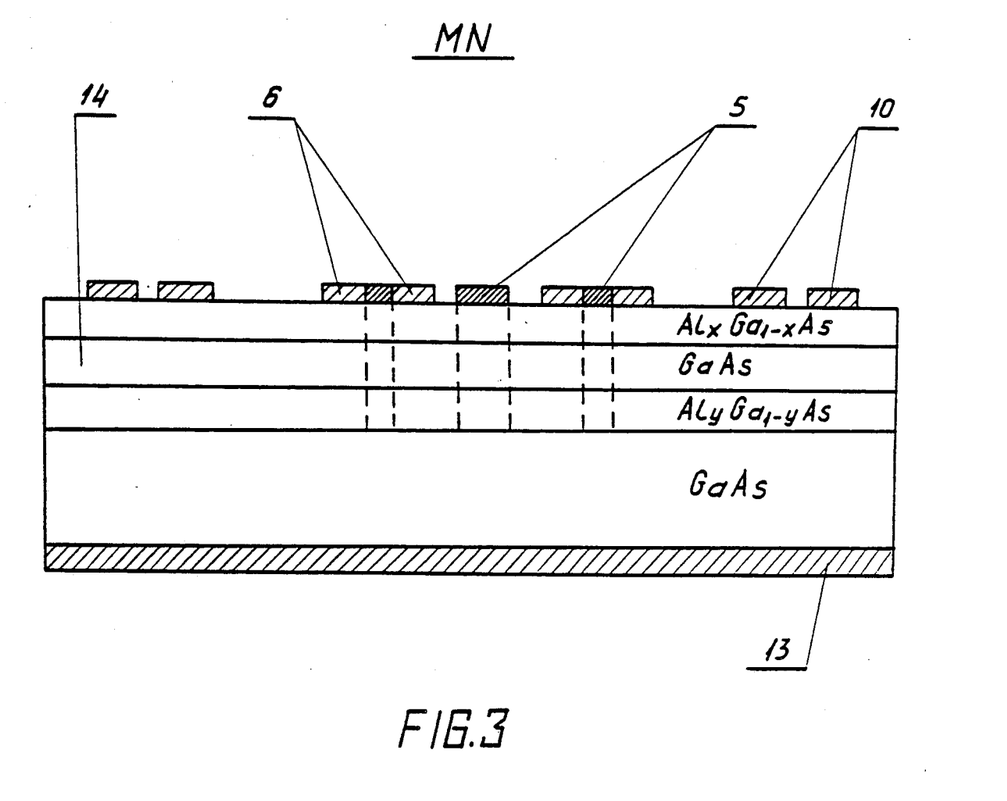
FIG. 3 shows the integral optical structure of an optical transistor according to the invention.

The device in accordance with the second embodiment of the optical transistor (FIG. 2) comprises heterostructures $Al_xCa_{1-x}$-As-GaAs-$Al_yCa_{y-1}$As in the waveguide layer (FIG. 3.), a ring vibrator 2 and waveguides 3. Four semiconductor lasers 1 with electrodes 5 on the upper surface of the structure intersect the ring vibrator. Each of the waveguides 3 is optically coupled with the ring vibrator and control electrodes 6 are provided over the regions of optical coupling $A_1D_2$, $A_2B_1$, $C_2D_1$, $B_2C_1$. Control electrodes 9, 6, which are designated as $A_1$, $A_2$, $B_1$, $B_2$, $C_1$, $C_2$, $D_1$, $D_2$ and $A_1$, $D_2$, $A_2$, $B_1$, $C_2$, $D_1$, $B_2$, $C_1$ are provided over the regions of all the directional couplers. A continuous electrode 13 is formed on the lower base of the substrate (FIG. 3).

Neighboring end sections of the strip waveguides 3 have four pairs of regions ($A_1A_2$, $B_1B_2$, $C_1C_2$, $D_1D_2$) of mutual optical coupling.

The transfer of optical radiation in the coupled directional coupler (for example, $A_1A_2$ (FIG. 2)) from one input of the waveguide (for example, $A_1$) to another ($A_2$) taken place in the absence of a control signal. This means that, with a predetermined coupling factor, the bond length is equal to the critical value, i.e. such that the power is fully transferred from one input of the waveguide to another (for example from $A_1$ to $A_2$). In the proposed device this is valid for any coupled directional couplers and also for the formed waveguides and ring vibrator (for example, waveguides $A_1D_2$ and section of the ring $A_1D_2$). The ring vibrator 2 forms four pairs of coupled directional couplers. The coupling is maximum at exact resonance.

The effect of optical bistability is used to amplify the optical signals, making it possible to obtain either a hysteretic relationship or an unambiguous characteristic of a differential amplifier of optical signals by the initial detuning of the vobrator.

The device according to the second embodiment operates in the following manner. If no control signal is applied to the control electrodes, the lasers are in a waiting prior-to-threshold mode, the vibrator is detuned. An optical signal, which should be amplified and then switched to any (for example, $D_1$) output is applied to one (any one, for example, $A_1$) of the inputs of the waveguide 3. The radiation is transferred to the input $A_2$ of the waveguide 3 due to the optical coupling between the inputs $A_1$ and $A_2$ of the waveguides 3 and then to vibrator 2 due to the optical coupling between the waveguide $A_2$ and the ring vibrator 2 and goes counter-clockwise. This radiation, additional to the radiation from the lasers, results in that the process of brightening the environment begins in the vibrator 2 in accordance with relationship (1) and the property of the optical bistable cell, the waveguide-ring vibrator. This brightening is realized as the vibrator approaches exact resonance and the system is in a resonant state. The directional couplers, encompassed by feedback, show the properties of optical bistability and at a certain input power abruptly transfer to maximum output power. In the proposed device that transition is additionally initiated by the resonant properties of the ring vibrator 2, and also be the presence of active members-lasers 1, the radiation of which is also sobordinate to the effect of optical bistability. The peak values of the output power in any of the output channels can be tens and hundreds of times greater than the input. At the same time the slope of the "light-light" characteristic is sufficiently high so that the value of $10^3$–$10^4$ is a realistic value for the gain factor.

The radiation is transferred in the direction $C_1$, $D_1$, $B_1$ due to the optical coupling of the resonant ring with the waveguides and toward $C_2$, $D_2$, $B_2$ due to the coupling between the waveguides. Since maximum coupling between the ring 2 and the waveguides 1 is achieved at exact resonance due to a change in the index of refraction in the vibrator, then peak power will be radiated at the output. Thus, the signal, applied to the input $A_1$, is radiated, power amplified, from any of the outputs. In order to obtain an amplified signal at only, for example, the $D_2$ output, electrical control signals should be applied to the $A_1A_2$, $C_2D_1$, $B_2C_1$, $A_2B_1$, $D_2D_1$ electrodes.

The following operation modes are possible:

from one input straight to all the outputs (or to some of the outputs), i.e. I x commutation;

from all inputs to one output, i.e. the multiplexing mode $n \times I$;

from one input sequentially in time to all the outputs $I \times n$;

connecting each to each sequentially in time, the complete access mode.

The proposed device can perform the function of a memory device, i.e. be a memory cell. The transition from the "low" state, corresponding to a logic zero, to a "high" state, corresponding to a logic one (FIG. 5), takes place abruptly with a sharp increase in the output light intensity due to the optical pulse exceeding a threshold intensity value.

Any of the inputs in the proposed device can be used to transfer an optical memory pulse. Reading can be accomplished at any output.

An example will now be given illustrating the operation of the memory device. The system is in an initial state: the lasers L are in the generation mode, there may be luminescence at any of the outputs due to to a minimal power corresponding to a logic zero. Let us assume that a pulse is applied to an input, which is transferred to the ring vibrator through the waveguide 3 of the directional coupler and the coupling section $A_1D_2$. The appearance of additional radiation (in addition to the radiation from the lasers) in the vibrator 2 results in a sequence of steps, already described: radiation in the vibrator increases due to the brightening of the environment and the resonant properties of the ring.

This is the "high" state of the system. When an electrical control pulse is applied to electrodes $A_1A_2$ logic one can be read at the output waveguides $D_2$, $C_2$, $B_2$, $A_2$; when the electrical control signal is applied to electrodes $D_1D_2$, $C_1C_2$, $B_1B_2$-at the outputs $D_1$, $C_1$, $B_1$, $A_1$.

Reading the state of the memory cells from only one output, e.g. $C_1$, is simply realized: the electrical control signals are applied to electrodes $A_1D_2$, $B_2C_1$, $A_2B_1$.

The logic one state is maintained whether or not reading was conducted or not. Erasure is done by disconnecting the lasers from the power meter in a pulse manner, the duration of the pulse can be less than $10^{-9}$ sec.

The integral optical structure of an optical transistor is shown in FIG. 3.

A structure based on tri-component solid solutions in a GaAs-AlAs system is grown on a substrate from GaAs using the epitaxial method.

Photomasks for producing electrodes and a screen to conduct ionic implantation are made using traditional photolithographic methods.

Coupler and the ring vibrator are produced in waveguide layer 14 using ionic implantation.

Gregg laser mirrors are produced in the upper layer of the structure using the interference photoetching method. Electrodes 5, 6, 10, 13 are produced on the upper surface of the structure, electrodes 10 are multi-sectional, electrode 5 and 6 are electrically isolated. The lower electrode 13 is a metal plate, on which the whole device is secured using solder on an indium base.

The $A_3B_5$ and $A_2B_6$ groups of semiconductors and multicomponent structures based thereon can be used to produce the commutator of the optical channels.

A commutator of optical channels with amplification of the optical signals according to FIG. 2 can be taken as the elementary cell for building switching matrixes and large size fields.

A diagram of the optical couplings of waveguides is shown in the drawing (FIG. 7) illustrating the positioning of ring waveguides $\Omega$ and the location of ring vibrators K, provieed with four laser 1 in a matrix with the full number of inputs equal to 32. The closed waveguide $\Omega$ optically couples four ring vibrators K.

Figure 7:
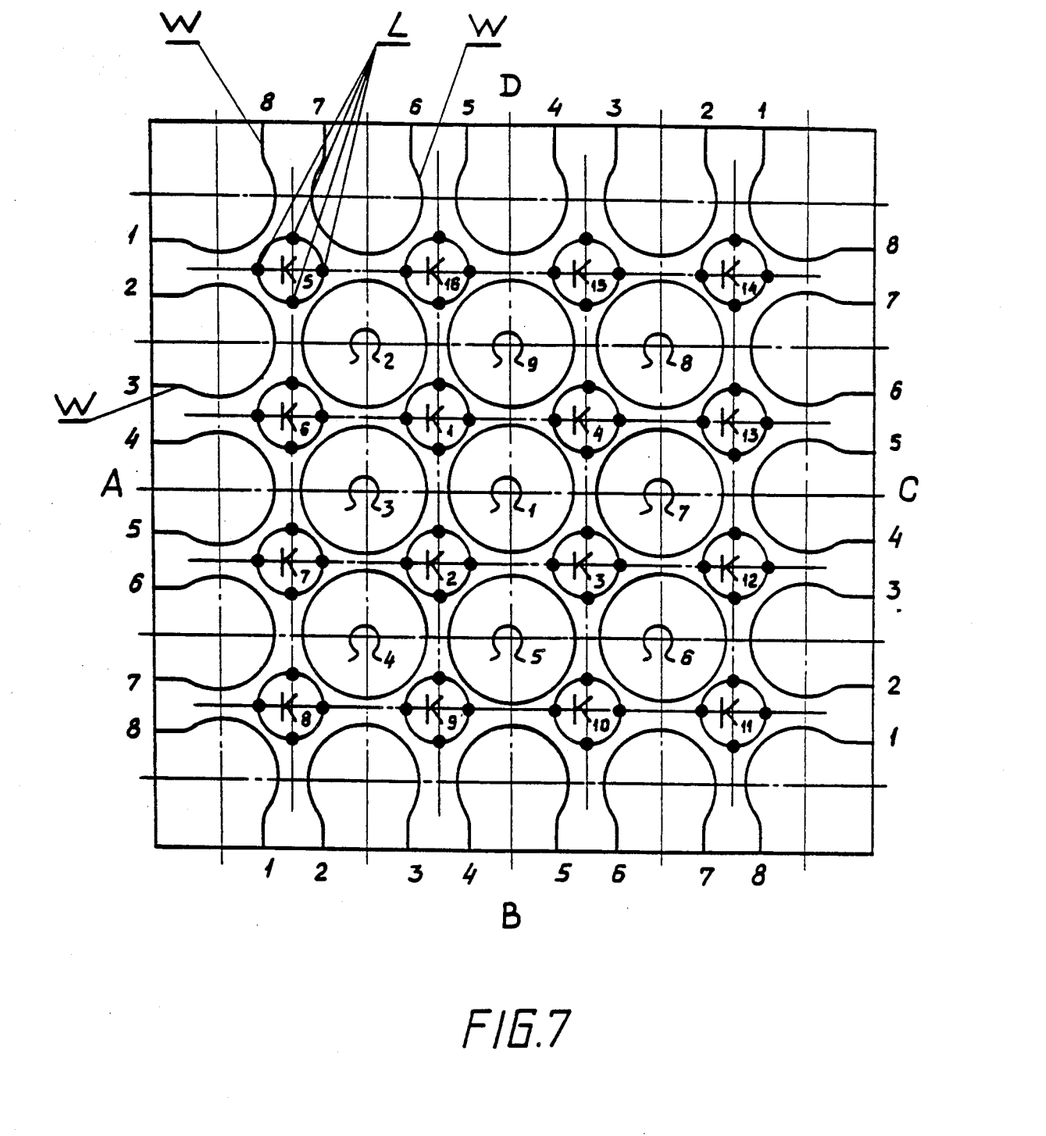
FIG. 7 shows the functional diagram of a matrix of optical transistors according to the invention.

The switching of optical radiation from any input to any output may take place over different optical paths. Thus, for example, switching from $A_1$ to $C_1$ may be accomplished in the following ways:

$A_1 \rightarrow K_1 \rightarrow \Omega \rightarrow R_3 \rightarrow C_2 \rightarrow C_1$ or $A_1 \rightarrow K_1 \rightarrow \Omega \rightarrow R_2 \rightarrow R_3 \rightarrow C_1$ or $A_1 \rightarrow K_1 \rightarrow \Omega \rightarrow R_4 \rightarrow R_3 \rightarrow C_2 \rightarrow C$ The device shown in FIG. 7 can operate as the matrix of a memory device. The specific feature of such a memory matrix is that the excited "high" state of optical bistability of the memory can be obtained by the application of an optical signal to any input and also can be read at any output.

It is only necessary to correctly select the algorithms for applying the electrical control pulses so that the state of a predetermined cell is shown by the luminescence at a predetermined output.

We claim:

1. An optical transistor comprising:
   a nonlinear ring vibrator and at least one pair of strip waveguides, positioned on a common substrate, each pair having a region of optical coupling with said nonlinear ring vibrator,
   wherein said regions of optical coupling corresponding to said pair of strip waveguides are positioned diametrically opposite each other,
   in which in order to expand the functional possibilities by obtaining bistable characteristics and a differential gain having a steep slope, additionally provided are at least two semiconductor lasers positioned in said nonlinear ring vibrator outside said regions of optical coupling,
   wherein each of said regions of optical coupling and each section of said nonlinear ring vibrator, located between said semiconductor lasers and said regions of optical coupling, are provided with control electrodes.

2. An optical transistor comprising:
   a nonlinear ring vibrator and two pairs of strip waveguides, positioned on a common substrate, each pair having a region of optical coupling with said nonlinear ring vibrator, four semiconductor lasers, in which, in order to increase the number of contacts and ensure complete access for switching the optical signals, the axial lines of each of the said strip waveguides, passing through said regions of optical coupling with said nonlinear ring vibrator, form an angle of 45° with each of the end sections of said strip waveguide,
   neighboring end sections of said strip waveguides have four regions of mutal optical coupling, provided with control electrodes and positioned in pairs opposite each other on two mutually perpendicular diametrical straight lines.

3. The optical transistor according to claim 2 forming as a composite member a switching matrix with the full number of inputs equal to 2n, where n is the number of cells of said switching matrix, which are formed by one said ring vibrator comprising said four lasers and by four contiguous strip waveguides, one of which is a closed waveguide.

* * * * *